United States Patent
Colmenares

(10) Patent No.: US 9,847,036 B2
(45) Date of Patent: Dec. 19, 2017

(54) WEARABLE AIRCRAFT TOWING COLLISION WARNING DEVICES AND METHODS

(71) Applicant: Gulfstream Aerospace Corporation, Savannah, GA (US)

(72) Inventor: Simón Colmenares, Savannah, GA (US)

(73) Assignee: Gulfstrem Areospace Corporation, Savannah, GA (US)

( * ) Notice: Subject to any disclaimer, the term of this patent is extended or adjusted under 35 U.S.C. 154(b) by 0 days.

(21) Appl. No.: 15/092,350

(22) Filed: Apr. 6, 2016

(65) Prior Publication Data

US 2017/0294132 A1    Oct. 12, 2017

(51) Int. Cl.
| | | |
|---|---|---|
| *G01C 23/00* | (2006.01) | |
| *G08G 5/06* | (2006.01) | |
| *B64F 1/22* | (2006.01) | |
| *G06T 19/00* | (2011.01) | |
| *G06T 7/60* | (2017.01) | |
| *G06K 9/52* | (2006.01) | |
| *G06K 9/00* | (2006.01) | |
| *G06T 7/20* | (2017.01) | |
| *G06K 9/66* | (2006.01) | |

(52) U.S. Cl.
CPC ............ *G08G 5/065* (2013.01); *B64F 1/225* (2013.01); *G06K 9/00335* (2013.01); *G06K 9/52* (2013.01); *G06K 9/66* (2013.01); *G06T 7/20* (2013.01); *G06T 7/60* (2013.01); *G06T 19/006* (2013.01)

(58) Field of Classification Search
USPC .......................................................... 701/3
See application file for complete search history.

(56) References Cited

U.S. PATENT DOCUMENTS

| | | | |
|---|---|---|---|
| 8,467,133 B2 | 6/2013 | Miller | |
| 2011/0257929 A1* | 10/2011 | Richter | ...................... B64F 1/22 702/150 |
| 2013/0321176 A1* | 12/2013 | Vasek | ...................... G08G 5/04 340/945 |
| 2014/0309870 A1* | 10/2014 | Ricci | ...................... H04W 48/04 701/36 |
| 2015/0051757 A1* | 2/2015 | Cox | ...................... B64D 45/00 701/3 |
| 2015/0232065 A1* | 8/2015 | Ricci | ...................... B60R 25/01 701/36 |
| 2015/0262492 A1* | 9/2015 | Barnes | ................... B64D 47/08 701/301 |

* cited by examiner

*Primary Examiner* — Tyler D Paige
(74) *Attorney, Agent, or Firm* — LKGlobal | Lorenz & Kopf LLP

(57) ABSTRACT

The disclosed embodiments describe collision warning devices, controllers, and computer readable media. A collision warning device for towing vehicles includes a housing, a scanning sensor, a display, and a controller. The housing is configured to be secured to at least one of a tow operator and a tug during aircraft towing operations. The a scanning sensor is secured to the housing and is configured to scan an aircraft and to scan an object in an environment surrounding the aircraft. The controller is mounted to the housing and is operably coupled with the scanning sensor and the display. The controller is configured to generate a three dimensional (3D) model of the aircraft and the environment based on a signal output from the scanning sensor, and to calculate potential collisions between the aircraft and the object based on the 3D model.

20 Claims, 3 Drawing Sheets

WEARABLE AIRCRAFT TOWING COLLISION WARNING DEVICES AND METHODS

TECHNICAL FIELD

Embodiments of the present invention generally relate to devices and methods for aircraft collision warning and avoidance, and more particularly relate to methods and devices that employ wearable augmented reality devices that model aircraft and environments to warn of potential collisions.

BACKGROUND OF THE INVENTION

Aircraft are commonly towed by ground vehicles, such as tugs, to maneuver in tight spaces. For example, aircraft tow operators may use a tug to maneuver an aircraft to or from a hangar, or to back an aircraft away from a terminal. Aircraft tow operators are sometimes faced with the difficult task of moving aircraft in areas where the potential exists for collisions with other aircraft and ground structures/objects/buildings. These collisions occur on occasion, and there is a high cost of repair associated with damage to the aircraft and any object involved in the collision. Conventional aircraft towing operations utilize "wing walker" ground crew to aid, advise, and alert the tow operator of proximity to other objects.

Alerting systems have also been developed to alert the ground and flight crews of pending collisions. Such conventional alerting systems rely on sensors mounted to extremities of the aircraft to provide proximity data. Systems disposed on the extremities of the aircraft, however, typically require some central communication and aircraft power, which may not be available during towing. Furthermore, power and communication cables associated with such conventional alerting systems increase the weight and complexity of the aircraft. Although conventional towing operations and alerting systems are suitable for their intended purpose, the need for improved systems is essentially constant.

As such, it is desirable to provide collision warning devices, controllers, and non-transitory media that alert tow operators of potential collisions while limiting the weight and complexity added to the aircraft. In addition, other desirable features and characteristics will become apparent from the subsequent summary and detailed description, and the appended claims, taken in conjunction with the accompanying drawings and this background.

SUMMARY

Various non-limiting embodiments of collision warning devices, controllers, and non-transitory computer readable media are disclosed herein.

In a first non-limiting embodiment, a collision warning device for towing vehicles includes, but is not limited to, a housing, a scanning sensor, a display, and a controller. The housing is configured to be secured to at least one of a tow operator and a tug during aircraft towing operations. The scanning sensor is secured to the housing and is configured to scan an aircraft and to scan an environment surrounding the aircraft. The display is configured to present visual data for the tow operator. The controller is mounted to the housing and is operably coupled with the scanning sensor and the display. The controller is configured to generate a three dimensional (3D) model of the aircraft and the environment based on a signal output from the scanning sensor, and to calculate potential collisions between the aircraft and an object in the environment based on the 3D model.

In a second non-limiting embodiment, a controller includes, but is not limited to, a memory unit and a processor. The memory unit stores instructions that, when executed by the processor, cause the controller to generate a three dimensional (3D) model of an aircraft and an environment around the aircraft based on a signal output from a scanning sensor. The instructions further cause the controller to calculate potential collisions between the aircraft and an object in the environment based on the 3D model.

In a third non-limiting embodiment, a non-transitory computer readable medium includes, but is not limited to, instructions that cause a controller to generate a three dimensional (3D) model of an aircraft and an environment around the aircraft based on a signal output from a scanning sensor. The instructions further cause the controller to calculate potential collisions between the aircraft and an object in the environment based on the 3D model.

DESCRIPTION OF THE DRAWINGS

Advantages of the present embodiments will be readily appreciated as the embodiments becomes better understood by reference to the following detailed description, when considered in connection with the accompanying drawings wherein.

DESCRIPTION OF EXEMPLARY EMBODIMENTS

The following detailed description is merely exemplary in nature and is not intended to limit the invention or the application and uses of the invention. Furthermore, there is no intention to be bound by any theory presented in the preceding background or the following detailed description.

Various non-limiting embodiments of collision warning devices, controllers, and non-transitory media are described herein. In general, some embodiments describe devices with integrated three dimensional (3D) modeling scanners and controllers. The devices scan and determine positions and dimensions of aircraft and objects in an environment in which the aircraft is located. For example, the devices may map and dimension the aircraft in tow (including nose, tail, wing-tips) as the operator looks at aircraft while towing. In some embodiments, the devices are augmented reality devices that may be worn on the head of a tow operator. As the towing proceeds, the device maps other obstacles (other aircraft, ground buildings, markings, etc.) that come into range of sensors on the devices. An algorithm programmed into the device uses these object maps and determines in real-time potential collisions, and may alert the operator to either stop or change path. In some embodiments, the devices provide the operator with "best path" guidance to avoid potential collisions. In some embodiments, the devices interface with a tow vehicle to apply brakes in order to avoid an imminent collision.

Figure 1:
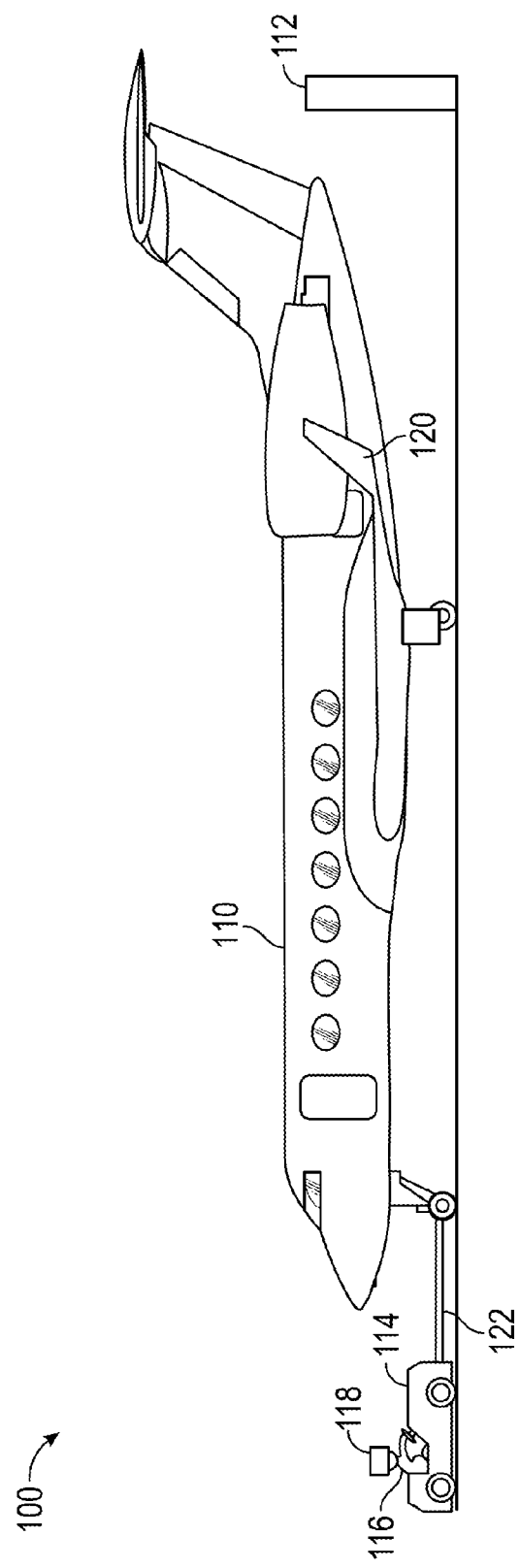
FIG. 1 is a simplified diagram illustrating a non-limiting embodiment of an aircraft towing environment in accordance with the teachings of the present disclosure.

FIG. 1 illustrates a non-limiting embodiment of an aircraft towing environment 100 in accordance with teachings of the present disclosure. Aircraft towing environment 100 includes an aircraft 110, an obstacle or object 112, a towing vehicle or tug 114, a tow operator 116, and a collision warning device 118. In the example provided, environment 100 illustrates a jet aircraft backing out of a hangar. It should be appreciated that the embodiments described herein may be utilized with any vehicles (e.g., helicopters, boats, airships) or machinery that require towing without departing from the scope of the present disclosure.

Object 112 is located where a wingtip 120 of aircraft 110 may collide with object 112 without proper maneuvering by tow operator 116. For example, object 112 may be a wall of a hangar, a wing of another plane, a refueling truck, or any other object that would cause damage to aircraft 110 upon collision. Any number of objects 112 may be located in environment 100. The features of collision warning device 118 described below are applicable to each object present in environment 100, as will be appreciated by those with ordinary skill in the art.

Tug 114 is coupled with aircraft 110 by a linkage 122 for pushing or pulling aircraft 110 into other positions. Tow operator 116 drives tug 114 to maneuver aircraft 110 into our out of hangars, out of terminal gates, or into any other position in which towing is required or desirable.

Figure 2:
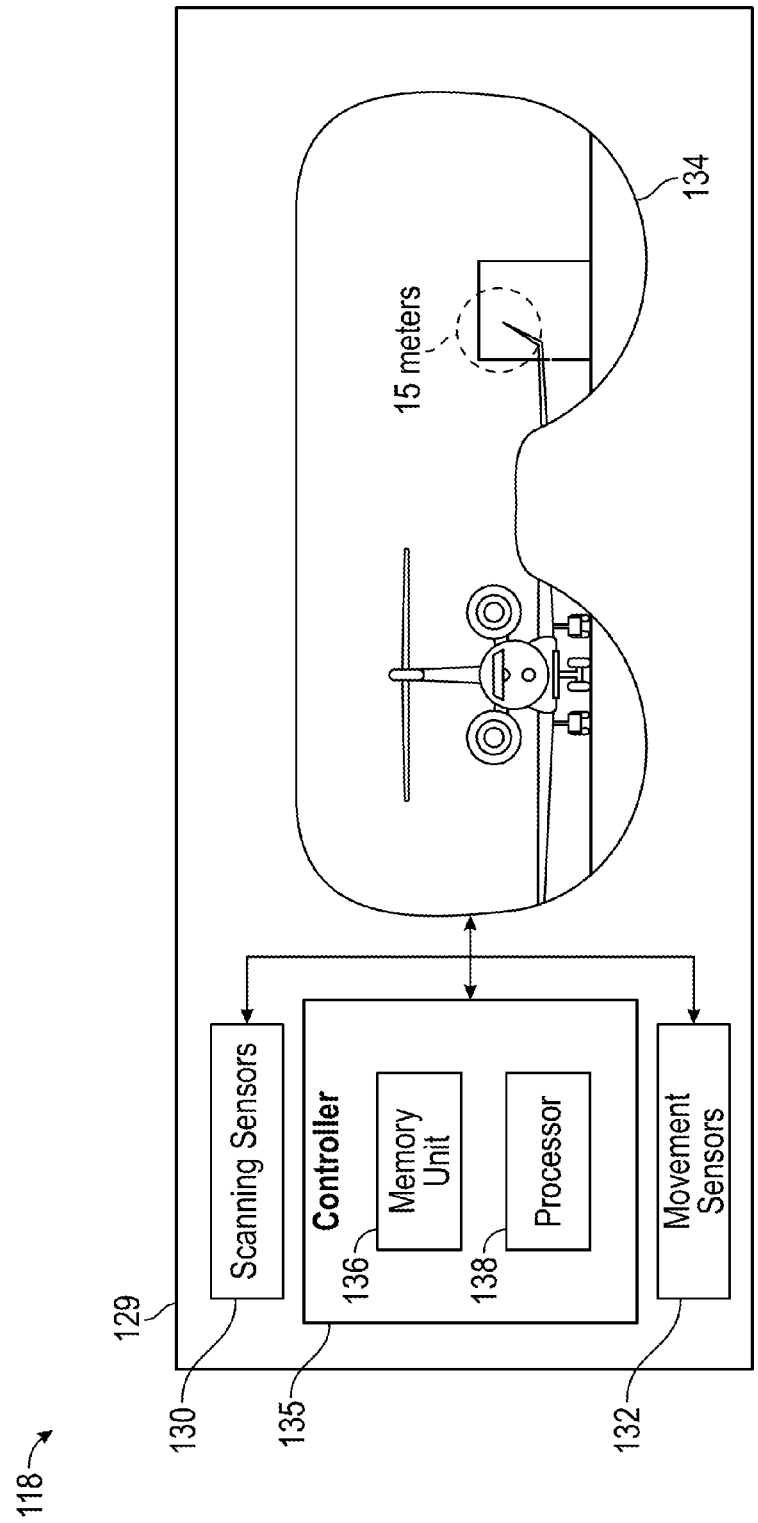
FIG. 2 is a simplified block diagram illustrating a non-limiting embodiment of the collision warning device in the aircraft towing environment of FIG. 1.

FIG. 2 illustrates a non-limiting embodiment of collision warning device 118. In the example provided, collision warning device 118 is an augmented reality (AR) device with a housing 129, scanning sensors 130, movement sensors 132, a display 134, and a controller 135 having a memory unit 136 and a processor 138. In some embodiments, collision warning device 118 may utilize commercially available augmented reality devices, such as the augmented reality goggles sold under the trade name "HOLOLENS" and having the model name "Development Edition," available from MICROSOFT Corporation of Redmond, Wash. In the example provided, collision warning device 118 is self-powered, untethered, small enough to be head-worn, and self-contained without need of external hardware.

Housing 129 is configured to be secured to at least one of tow operator 116 and tug 114 during aircraft towing operations. For example, housing 129 may be configured as a tablet device that rests or secures on tug 114 within view of tow operator 116. In the example provided, housing 129 is a head wearable augmented reality (AR) frame, such as a helmet or glasses frames, as will be appreciated by those with ordinary skill in the art.

Scanning sensors 130 are secured to housing 129 and are configured to scan aircraft 110 and to scan all objects 112 in environment 100 surrounding aircraft 110. Scanning sensors 130 may employ any suitable technology that provides data for 3D modeling of environment 100, such as, but not limited to, optical technology, ultrasound technology, infrared technology, and capacitive technology. Scanning sensors 130 are sometimes referred to as "deep sensors," "depth sensors," or "3D sensors," as will be appreciated by those with ordinary skill in the art. In some embodiments, scanning sensors 130 are oriented for 360 degree scanning around the head of tow operator 116. In some embodiments, scanning sensors 130 may be oriented to scan only in the direction tow operator 116 is looking.

Movement sensors 132 determine directions and amounts of movement by collision warning device 118. Movement sensors 132 may include accelerometers, gyroscopes, global navigation satellite system (GNSS) receivers, and other movement detection sensors. In the example provided, movement sensors 132 are configured to output movement signals indicating movement of collision warning device 118 for use by controller 135. For example, accelerometers may be used to determine when tow operator 116 is moving aircraft 110 closer to a potential collision by calculating movement of an aircraft computer model in an environment computer model based on movement signals from movement sensors 132, as will be described below.

Display 134 is configured to present visual data for the tow operator. For example, controller 135 may generate signals that cause display 134 to display warnings, distance information, and other relevant data for tow operator 116. In the example provided, display 134 is a transparent augmented reality (AR) display onto which warnings and other data are overlaid to augment the natural vision of tow operator 116, as will be appreciated by those with ordinary skill in the art. In some alternative embodiments, display 134 may be an opaque display screen that presents a video image of a view from tug 114 with warnings and data superimposed on the video image.

Controller 135 is a hardware device that carries out instructions of a computer program, as is well known to those of ordinary skill in the art. Controller 135 is configured to execute the computer program to provide the functions illustrated in FIG. 3 and described below. Controller 135 includes one or more memory units 136 that store electronic data and computer programs. For example, memory units 136 may be flash memory, spin-transfer torque random access memory (STT-RAM), magnetic memory, phase-change memory (PCM), dynamic random access memory (DRAM), or other suitable electronic storage media. In the example provided, memory units 136 store control logic with instructions that cooperate with processor 138 to perform operations of the method described below. In some embodiments, processor 138 may include one or more central processing units ("CPUs"), a microprocessor, an application specific integrated circuit ("ASIC"), a microcontroller, and/or other suitable device. Furthermore, controller 135 may utilize multiple hardware devices as is also appreciated by those skilled in the art. In the example provided, controller 135 is mounted in housing 129 and is operably coupled with scanning sensors 130 and display 134.

Figure 3:
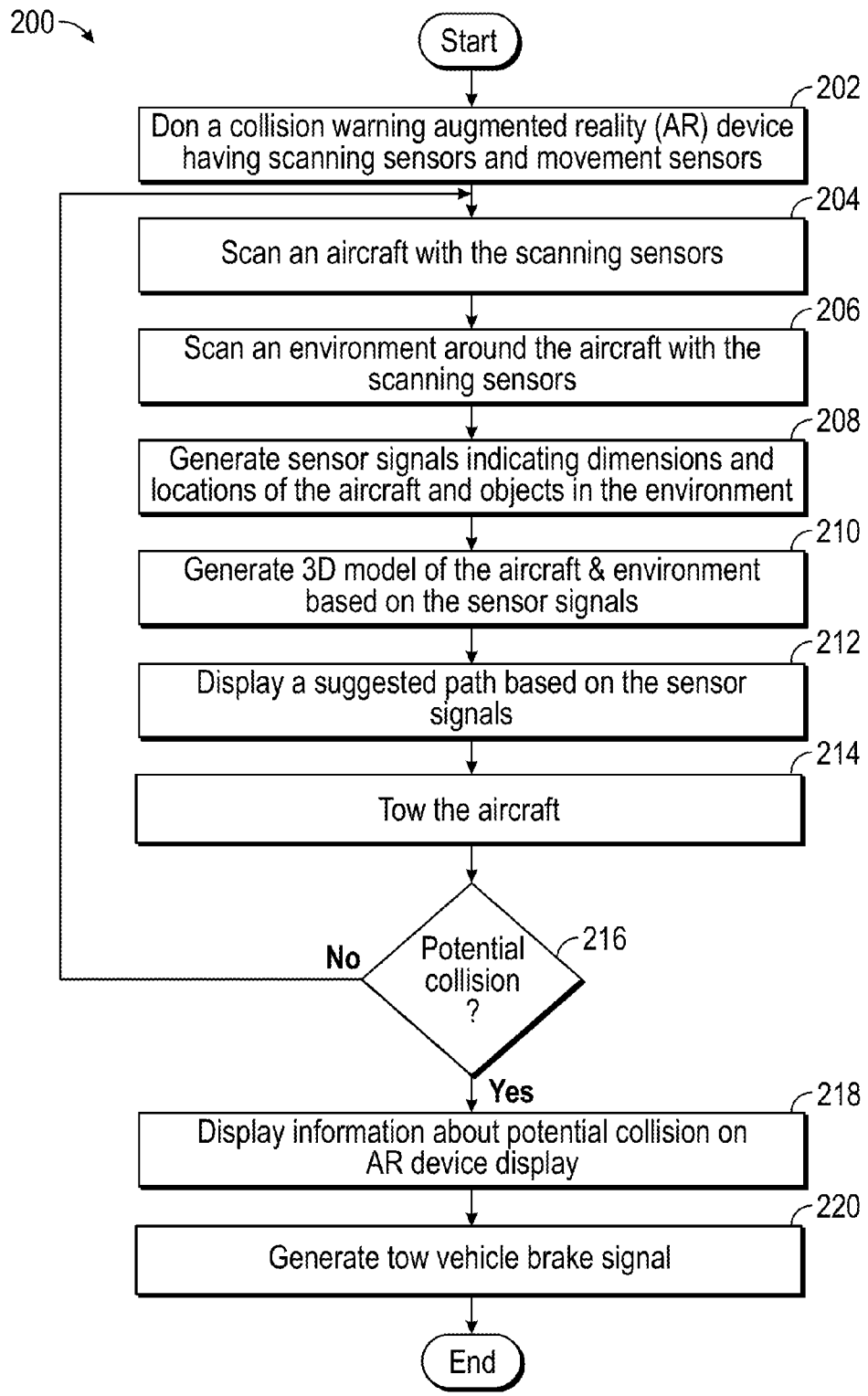
FIG. 3 is a flow diagram illustrating a non-limiting embodiment of a method for providing a warning to an operator of an aircraft towing vehicle in accordance with the teachings of the present disclosure.

FIG. 3 illustrates a non-limiting embodiment of a method 200 for providing a warning to an operator of an aircraft towing vehicle in accordance with the teachings of the present disclosure. With continuing reference to FIGS. 1-2, various operations of method 200 are performed by components of collision warning device 118.

A tow operator dons a collision warning augmented reality (AR) device in operation 202. In the example provided, tow operator 116 dons collision warning device 118. It should be appreciated that tow operator 116 may utilize any suitable device having integrated sensors, processors, displays, and/or other Human-Machine Interfaces (HMI).

The AR device scans an aircraft with scanning sensors in operation 204 and scans an environment around the aircraft with the scanning sensors in operation 206. For example, scanning sensors 130 of collision warning device 118 may measure dimensions and distances of aircraft 110 and objects 112 in environment 100. The scanning sensors generate sensor signals indicating dimensions and locations of the aircraft and the objects or obstacles in operation 208.

In the example provided, controller 135 may match portions of the scanned aircraft with known aircraft shapes so that the entire aircraft need not be scanned for each towing operation. For example, upon determining that the wing shape and size matches a known size and shape in a database, controller 135 may load an existing model of aircraft 110 for use in the collision warning operations. In some embodiments, collision warning device 118 utilizes optical character recognition to determine whether the model of aircraft is painted on aircraft 110 or to match the aircraft registration number with the aircraft model. In some embodiments, pre-modeled buildings may be loaded into the model based on the location of collision warning device (e.g., location provided by GNSS signal). In some embodiments, no matching is utilized and tow operator 116 must scan the entire aircraft to generate the model.

A controller receives the sensor signals and generates a three dimensional (3D) model of the aircraft and the objects of the environment based on the sensor signals in operation 210. For example, controller 135 may receive a signal output generated by scanning sensors 130 to generate a 3D model of environment 100 with aircraft 110 and objects 112. In the example provided, a representation of the 3D model is presented as outlines of the objects on AR display 134 to augment normal vision of tow operator 116. As will be appreciated by those with ordinary skill in the art, a 3D model generates computerized representations of each object scanned and the relative locations of each object.

The controller causes a display to present a suggested path based on the sensor signals in operation 212. For example, controller 135 may calculate a path by which tow operator 116 may drive tug 114 that will cause wingtip 120 to avoid collision with object 112, and may cause display 134 to present the suggested path. In some embodiments, controller 135 is configured to calculate the suggested path of the aircraft in response to detecting the towing operations. For example, controller 135 may detect the towing operations based, at least in part, on movement signals generated by movement sensors 132. The tow operator tows the aircraft in operation 214. For example, tow operator 116 may proceed with normal towing operations of aircraft 110.

The controller determines whether a potential collision exists in operation 216 based on the sensor signals and the 3D model. For example, controller 135 may calculate distances between aircraft 110 and objects 112 and determine that a potential collision exists when the calculated distances fall below a predetermined threshold distance. In some embodiments, controller 135 utilizes movement sensors 132 checked against scanning sensors 130 to determine that aircraft 110 is on a path to collision with object 112. The 3D models of aircraft 110 and objects 112 are stored in memory unit 136, so controller 135 is aware of the positions of wingtip 120 and a tail of aircraft 110 with respect to object 112 even when wingtip 120 and the tail are not in view of scanning sensors 130. In some embodiments, controller 135 considers aircraft 110 to be separate from object 112 so that detecting movement of aircraft 110 indicates relative movement of aircraft 110 with respect to object 112 even when object 112 is not in view of scanning sensors 130. When no potential collision exists, method 200 returns to operation 204 to continuously scan environment 100 and monitor for potential collisions. In contrast, when there is a potential collision, method 200 proceeds to operation 218.

The controller causes the display to present a warning or other information about the potential collision in operation 218 in response to calculating the potential collision. For example, controller 135 may cause AR display 134 to overlay the information to augment normal vision of tow operator 116. In the example shown in FIG. 2, a distance between wingtip 120 and object 112 is presented to tow operator 116 as information about a potential collision. It should be appreciated that other types of visual presentations and warnings may be incorporated without departing from the scope of the present disclosure. For example, components at risk may be color coded by collision potential, arrows may be presented directing the tow operator to look at other components when the device is pointed away from a potential collision, and haptic or aural alerts may be utilized, among other variations.

In the example provided, the controller generates a tow vehicle brake signal in operation 220. For example, collision warning device 118 may be communicatively coupled with tug 114 to communicate the brake signal to halt tug 114 in operation 220. In some embodiments where tug 114 is not communicatively coupled with collision warning device 118, controller 135 may cause display 134 to present a stop sign or other indicator that tow operator 116 should stop.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A collision warning device comprising:
   a housing configured to be secured to at least one of a tow operator and a tug during aircraft towing operations;
   a scanning sensor secured to the housing and configured to scan an aircraft and to scan an environment surrounding the aircraft;
   a display configured to present visual data for the tow operator; and
   a controller mounted to the housing and operably coupled with the scanning sensor and the display, the controller configured to:
   generate a three dimensional (3D) model of the aircraft and the environment based on a signal output from the scanning sensor; and
   calculate a potential collision between the aircraft and an object in the environment based on the 3D model.

2. The collision warning device of claim 1, wherein the controller is further configured to present a warning on the display in response to calculating the potential collision.

3. The collision warning device of claim 1, wherein the housing is configured to be worn on a head of the tow operator during the aircraft towing operations.

4. The collision warning device of claim 3, wherein the display is an augmented reality display, and wherein the controller is further configured to overlay a warning on the augmented reality display in response to calculating the potential collision between the aircraft and the object.

5. The collision warning device of claim 4, wherein the controller is further configured to alert the tow operator by overlaying on the augmented reality display a distance between the aircraft and the object.

6. The collision warning device of claim 1, wherein the controller is further configured to calculate distances between the aircraft and the object based at least in part on sensor signals from the scanning sensor and to alert the tow operator of the potential collision in response to a calculated distance dropping below a threshold.

7. The collision warning device of claim 1, wherein the controller is further configured to calculate a path of the aircraft in response to detecting towing operations.

8. The collision warning device of claim 7, further comprising movement sensors configured to output movement signals indicating movement of the collision warning device, wherein the controller is configured to calculate the path of the aircraft based, at least in part, on the movement signals.

9. The collision warning device of claim 8, wherein the controller is further configured to calculate a suggested path that will avoid the potential collision between the aircraft and the object, and wherein the controller is further configured to cause the display to present the suggested path for the tow operator.

10. A controller comprising:
a processor; and
a memory unit storing instructions that, when executed by the processor, cause the controller to:
generate a three dimensional (3D) model of an aircraft and an environment around the aircraft based on a signal output from a scanning sensor; and
calculate potential collisions between the aircraft and an object in the environment based on the 3D model.

11. The controller of claim 10, wherein the instructions further cause the controller to generate signals that cause a display to present a warning in response to calculating the potential collision.

12. The controller of claim 10, wherein the instructions further cause the controller to overlay a warning on an augmented reality display in response to calculating the potential collision between the aircraft and the object.

13. The controller of claim 12, wherein the instructions further cause the controller to alert a tow operator by overlaying on the augmented reality display a distance between the aircraft and the object.

14. The controller of claim 10, wherein the instructions further cause the controller to calculate distances between the aircraft and the object based at least in part on sensor signals from the scanning sensor and to alert a tow operator of a potential collision in response to a calculated distance dropping below a threshold.

15. The controller of claim 10, wherein the instructions further cause the controller to calculate a suggested path that will avoid the potential collision between the aircraft and the object, and to generate a signal that causes a display to present the suggested path for a tow operator.

16. A non-transitory computer readable medium comprising instructions that cause a controller to:
generate a three dimensional (3D) model of an aircraft and an environment around the aircraft based on a signal output from a scanning sensor; and
calculate a potential collision between the aircraft and an object in the environment based on the 3D model.

17. The non-transitory computer readable medium of claim 16, wherein the instructions further cause the controller to generate signals that cause a display to present a warning in response to calculating the potential collision.

18. The non-transitory computer readable medium of claim 16, wherein the instructions further cause the controller to overlay a warning on an augmented reality display in response to calculating the potential collision between the aircraft and the object.

19. The non-transitory computer readable medium of claim 16, wherein the instructions further cause the controller to alert a tow operator by overlaying on an augmented reality display a distance between the aircraft and the object.

20. The non-transitory computer readable medium of claim 16, wherein the instructions further cause the controller to calculate a suggested path that will avoid the potential collision between the aircraft and the object, and to generate a signal that causes a display to present the suggested path for a tow operator.

* * * * *